United States Patent [19]

Cameron et al.

[11] Patent Number: 4,832,443
[45] Date of Patent: May 23, 1989

[54] FIBRE OPTIC CABLE HAVING A LAYER OF A POLYETHYLENE COMPOSITION AND PROCESS OF MAKING SAME

[75] Inventors: Robert Cameron, Stirling; Denis J. McMahon, Stirlingshire, both of United Kingdom

[73] Assignee: Bp Chemicals Limited, London, England

[21] Appl. No.: 174,234

[22] Filed: Mar. 28, 1988

[30] Foreign Application Priority Data

Apr. 15, 1987 [GB] United Kingdom ............... 8709071

[51] Int. Cl.$^4$ .................... G02B 6/44; C08F 10/00
[52] U.S. Cl. ............................ 350/96.23; 350/320; 174/70 R; 526/281
[58] Field of Search ............ 350/96.23, 96.34, 96.10, 350/320; 174/70 R; 526/281

[56] References Cited

U.S. PATENT DOCUMENTS

| 4,172,106 | 10/1979 | Lewis | 350/96.23 X |
| 4,302,073 | 11/1981 | Bendayan et al. | 350/96.23 |
| 4,437,729 | 3/1984 | Parfree et al. | 350/96.23 |
| 4,460,419 | 7/1984 | Parfree et al. | 350/96.23 |
| 4,614,778 | 9/1986 | Kajiura et al. | 526/281 |
| 4,750,805 | 6/1988 | Vaderwall | 350/96.23 |
| 4,778,244 | 10/1988 | Ryan | 350/96.23 |

FOREIGN PATENT DOCUMENTS

| 011794309 | 9/1984 | European Pat. Off. | 350/96.23 X |
| 2018459 | 10/1979 | United Kingdom | 350/96.23 X |
| 2170019 | 7/1986 | United Kingdom | 350/96.23 X |

Primary Examiner—William L. Sikes
Assistant Examiner—Brian M. Healy
Attorney, Agent, or Firm—Brooks, Haidt, Haffner & Delahunty

[57] ABSTRACT

A fibre optic cable suitable for use as a long distance submarine telecommunications cable comprises a tubular electrical conductor (8) within which are tension members and a core containing optical fibres (1 to 6), the tubular electrical conductor (8) being coated with a polyethylene composition comprising a linear medium density polyethylene which is a copolymer of ethylene and a $C_4$ to $C_{10}$ alpha-olefin which copolymer has a density of from 0.928 to 0.940 g/cm$^3$, a Melt Index of at least 2.5 dg/min, a melting point of from 118° to 127° C. and a weight average molecular weight of from 80,000 to 100,000.

10 Claims, 1 Drawing Sheet

FIBRE OPTIC CABLE HAVING A LAYER OF A POLYETHYLENE COMPOSITION AND PROCESS OF MAKING SAME

BACKROUND OF THE INVENTION

The present invention relates to a fibre optic cable having a layer of a polyethylene composition and in particular to a fibre optic cable suitable for use as a long distance submarine telecommunications cable.

Optical fibres are increasingly being used in communications systems especially telecommunications systems and in recent years a great deal of effort has been expended designing and developing cables and associated equipment for telecommunications cables.

There are various designs for fibre optic cables, but generally they comprise a tube within which are tension members and a core containing the optical fibres, the tube being coated with a polymeric layer. For example, Published UK patent application, GB-A-2170019, discloses a submarine optical fibre cable comprising a core collection of optical fibres, tension members, a pressure-resistant tube and a jacket. The jacket is composed of a modified polyolefin, such as low-density or linear low density polyethylene, which has been at least partially grafted with vinyltrialkoxysilane.

For long distance optical fibre telecommunications cable it is necessary to use repeater units along the length of the cable. These repeaters are electrically powered. For land based cables it would be possible to supply the required electrical power externally at the location of each repeater unit. However, this is not practicable for long distance submarine telecommunications cable. Therefore, the optical fibre cables which have been developed for long distance submarine telecommunications systems have an electrical conductor running along the length of the cable to carry the electrical current to the repeater units. Typically, the current is of the order of 10 kVDC. Since these optical fibres carry electric current they have to be insulated. It is known to insulate optical fibre cables with high pressure, low density polyethylene.

It has now been found that the use of a linear medium density polyethylene, having certain defined properties to insulate a fibre optic cable or as a jacket for such a cable provides advantages in the manufacture and use of the cable. In particular, the insulation can be extruded about the optical fibre cable at a relatively low temperature and the polymer relaxes relatively quickly consequently the extrusion lines can be run at a relatively high speed.

The relaxation time of the polymer coating is important because residual stress in the coating can cause deformation of the coating leading to signal attenuation in the optical fibres. The stresses are typically due to deformation occurring during fabrication. They may only manifest themselves slowly, often as a result of temperature cycling. In adverse circumstances, these residual stresses can result in a reduction in the axial length of the cable coating of 5% or more. The use of the linear medium density polyethylene according to the present invention reduces the problems associated with the known polyethylene insulation and jacketing compositions which have relatively long relaxation times.

SUMMARY OF THE INVENTION

Thus, the present invention relates to a fibre optic cable, particularly a fibre optic cable suitable for use as a long distance submarine telecommunications cable, having a layer of a polyethylene composition characterised in that the polyethylene composition comprises a linear medium density polyethylene which is a copolymer of ethylene and a $C_4$ to $C_{10}$ alpha-olefin which copolymer has a density of from 0.928 to 0.940 g/cm$^3$, (ISO/1872/1-1986), a Melt Index of at least 2.5 dg/min (ISO/1133 1981 (E) Condition 4), a melting point of from 118° to 127° C. and a weight average molecular weight (Mw) of from 80,000 to 100,000.

Processes for the production of linear polyethylenes are known. The linear medium density polyethylene used according to the present invention can be prepared by any suitable process. A commercially available linear medium density polyethylene produced by a gas phase process has been found to be particularly suitable. This polymer is sold by BP Chemicals Limited under the trade designation LL0640. The melt index of the polyethylene will generally be no more than 6 dg/min.

Preferably, the polyethylene composition contains an antioxidant. Antioxidants suitable for use in polyethylene compositions are known and any such antioxidant can be used in the polymer composition according to the present invention. A preferred antioxidant is 1,3,5-trimethyl-2,4,6-tris[3,5-tert-butyl-4-hydroxybenzyl]benzene. This antioxidant is commercially available and is sold by Ciba Geigy under the trade designation Irganox 1330, by Shell under the trade designation Ionox 330 and by Ethyl Corporation under the trade designation Ethanox 330. (IRGANOX, IONOX and ETHANOX are trade marks). Preferably, sufficient antioxidant is included in the polyethylene composition to provide a Differential Scanning Calorimetry (DSC) oxidative induction time at 200° C. of more than 40 minutes as determined by the test method described in the French Post Office Specification CM24. This test method comprises placing a sample of the polyethylene composition in an aluminium cup of a Differential Scanning Calorimeter. A stream of oxygen-free nitrogen is passed over the sample at a rate of 200 cm$^3$/min and the temperature is raised rapidly to 200° C. When equilibrium is obtained at 200° C., the stream of nitrogen is replaced by a stream of oxygen at the same rate. The variation in the temperature of the cell is monitored until there is a substantial difference due to an exothermic phenomenon in the test. The oxidative induction time is the period of time in minutes from the introduction of oxygen to the start of the exotherm and is reported as the average of three measurements.

The linear medium density polyethylene and antioxidant blend preferably has a stress crack resistance, as determined by ASTM 1693, Condition B, Anterox C 0630 at 10% solution in water, of at least $F_o$ at 48 hours i.e. no failures within 48 hours.

The polyethylene composition preferably has a brittleness temperature of less than −50° C., as determined by the test method described in the British Telecom specification No. M 132 J. The test comprises preparing 200 test specimens which measure 75 mm×12 mm and comprise a 3.3±0.1 mm layer of the polyethylene composition under test sandwiched between two layers of a low molecular weight polyethylene layer, each layer being about 3.2 mm thick. A notch is cut across the 12 mm dimension of each test specimen to a depth of approximately 1.5 mm. Twenty of the test specimens are tested at each of ten temperatures so as to give as near as possible a series of equally spaced intervals above and below the brittleness temperature. The test specimens are cooled to the appropriate temperature and maintained at that temperature for at least 30 minutes. They are then removed from the cooling bath, clamped in the vice of a 4 J pendulum (Izod) type impact testing machine and their impact strength determined. A plot is made of the number of brittle failures at each temperature against the temperature. A brittle failure is defined as any break during the course of which less than 700 mJ of energy is absorbed. The brittleness temperature is the temperature at which 50% of the samples would exhibit failure.

In addition to the antioxidant, the polyethylene composition can optionally contain other additives conventionally used in insulation or jacket compositions such as, for example, stabilisers, fillers and carbon black.

The polyethylene composition may be crosslinked e.g. by the use of a free radical generator such as an organic peroxide or by irradiation. Crosslinking the polyethylene composition would improve the environmental stress crack resistance. However, when used in the manufacture of a long distance submarine telecommunications cable, the polyethylene composition would generally not be crosslinked.

BRIEF DESCRIPTION OF THE DRAWINGS

A submarine telecommunications cable embodying the present invention is illustrated in the accompanying drawings in which.

DETAILED DESCRIPTION OF THE INVENTION

Figure 1:
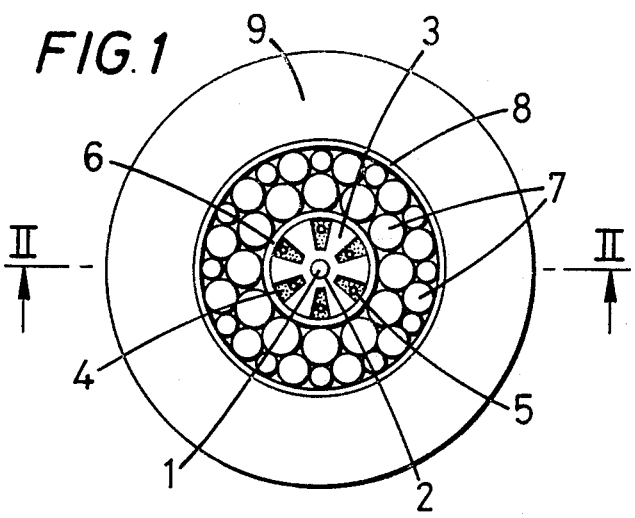
FIG. 1 is an end view of a section of the cable and FIG. 2 is a longitudinal section of the cable taken along the line II—II of FIG. 1.

At the centre of the cable is a tension member 1 which can be a steel cable. The tension member 1 runs through a central hole 2 in a plastic support element 3. Preferably, the support element 3 is formed about the tension member 1 by extrusion. The support element 3 has six helical grooves 4. Each of the helical grooves 4 contains an optical fibre 5 and is filled with a grease or jelly such as for example petroleum jelly or thixotropic polyisobutene. The plastic support element 3 is encased in an inner jacket 6 which can be of plastic or metal. Together these elements (1 to 6) comprise a core containing optical fibres. Stranded steel wires 7, which act as tension members, are helically wound around the inner jacket 6. An electrical conductor 8, generally a copper tube, is positioned about the steel wires. This conductor 8 carries the electrical current to power the repeater units (not shown) when the cable is in use. The electrical conductor is covered by the insulation layer 9 which comprises a linear medium density polyethylene which is a copolymer of ethylene and a $C_4$ to $C_{10}$ alpha-olefin which copolymer has a density of from 0.928 to 0.940 g/cm$^3$, a Melt Index of at least 2.5, a melting point of from 118° to 127° C. and a weight average molecular weight (Mw) of from 80,000 to 100,000. The cable can be provided with additional layers such as for example one or more armoured layers depending on the purpose for which the cable is to be used and the environment in which it is to be placed.

Figure 2:
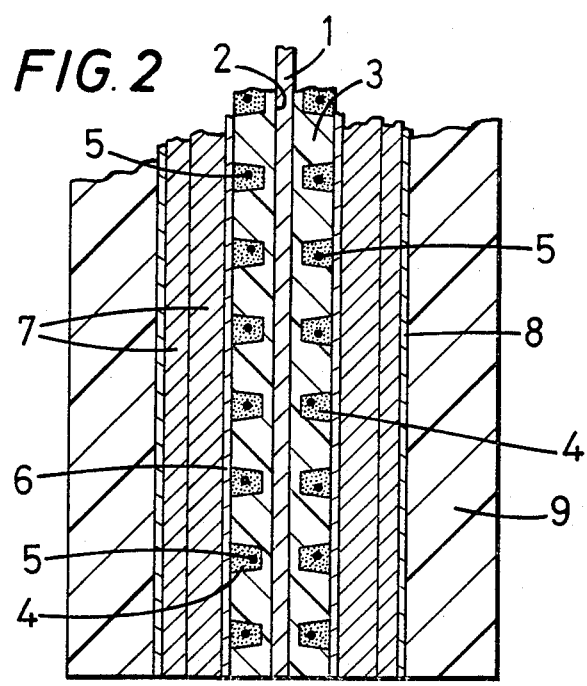

The optical fibre submarine telecommunications cable illustrated in FIGS. 1 and 2 is a typical design for such cables. However, the insulation composition according to the present invention can be used to insulate other designs of optical fibre cables and can also be used to coat optical fibre cable for unrepeated systems which cables, in general, do not carry electrical current.

The fibre optic cable according to the present invention can be manufactured using known techniques and apparatus.

The invention includes a process for manufacturing a fibre optic cable comprising extruding about a core containing optical fibres a polyolefin composition characterised in that the polyethylene composition comprises a linear medium density polyethylene which is a copolymer of ethylene and a $C_4$ to $C_{10}$ alpha-olefin which copolymer has a density of from 0.928 to 0.940 g/cm$^3$, a Melt Index of at least 2.5 dg/min, a melting point of from 118° to 127° C. and a weight average molecular weight of from 80,000 to 100,000. Generally the core containing optical fibres is within a tube and the polyolefin composition is extruded over the tube. The tube can be a tubular electrical conductor.

The invention is further illustrated by the following Example.

EXAMPLE

A fibre optic submarine telecommunications cable embodying the present invention, substantially as illustrated in FIGS. 1 and 2, was produced using conventional equipment and techniques for the manufacture of such cables. The electrical conductor (identified by the numeral 8 in the Figures) was a copper tube 12.8 mm in diameter and the insulation layer (identified by the numeral 9 in the Figures) was extruded over the electrical conductor to form a 6 mm thick coating.

The insulation layer (9) comprised a commercially available linear medium density polyethylene sold under the trade designation LL0640 by BP Chemicals Limited and 1,500 parts per million of a commercially available antioxidant sold by Ciba Geigy under the trade designation IRGANOX 1330 (IRGANOX is a registered trade mark). The linear medium density polyethylene is an ethylene-butene copolymer having a density of 0.930 g/cm$^3$ (ISO/1872/1-1986), a Melt Index of 3.75 dg/min (ISO/1133 1981 (E) Condition 4), a melting point of about 126° C. and a weight average molecular weight of 90,000.

The linear medium density polyethylene and antioxidant blend had a DSC oxidative induction time at 200° C. of 58.6 mins, as determined by the test method described in the French Post Office Specification CM24. The stress crack resistance of the blend, as determined by ASTM 1693, Condition B Anterox C 0630 at 10% solution in water, was greater than $F_o$ at 96 hours, i.e. no failures within 96 hours. The brittleness temperature of the blend was −76° C., as determined by the British Telecom specification No. M132J.

The linear medium density polyethylene and antioxidant were compounded using a ZSK 53 extruder. The polyethylene composition was extruded over the electrical conductor (8) using an Andouart extruder having a length to diameter ratio of 20. The screw diameter was 120 mm and the screw was of a conventional design for processing low density polyethylene. The compression ratio was 3.05. The extruder temperatures along the barrel were approximately 40° C. below the temperatures which would typically have been employed for the extrusion of high pressure, low density polyethylene. The melt temperature of the polymer composition was about 165° C.

The cable line was operated at its maximum design speed of 8 m/min. Although operating at a relatively high line speed, the pressure in the extruder head did not exceed 140 bar ($14 \times 10^6 N/m^2$) and the surface of the extrudate was smooth. If high pressure, low density polyethylene were to be extruded under similar conditions, the head pressure would be expected to be in the region of 250 to 300 bar ($25 \times 10^6$ to $30 \times 10^6 N/m^2$) and the surface of the extrudate would be expected to exhibit surface roughness, generally known in the art as "shark skin".

After extrusion the polyethylene composition had a melt index of 3.9 dg/min and a stress crack resistance of $F_o$ at 120 hours. These results indicate that little or no degradation occurred. Typically, a high pressure low density polyethylene extruded at similar temperature and pressures would be expected to exhibit an increase in melt index of 40 to 50%.

Two 50 m lengths of the fibre optic submarine telecommunications cable were subjected to a test to assess the amount of shrinkage of the insulation. The lengths of cable were stored in a warehouse under ambient conditions for 42 days after which time the length of shrinkage of the extruded insulation layer was measured. The shrinkage was 0.4/1000 which is very low compared with the shrinkage of 20/1000 which is typically encountered with the prior art insulation compositions.

The fatigue resistance of the cable was assessed by flexing the cable over a 900 mm radius for 3,000 cycles. No cracks were apparent.

We claim:

1. A fibre optic cable having a layer of a polyethylene composition characterised in that the polyethylene composition comprises a linear medium density polyethylene which is a copolymer of ethylene and a $C_4$ to $C_{10}$ alpha-olefin which copolymer has a density of from 0.928 to 0.940 g/cm$^3$, a Melt Index of at least 2.5 dg/min, a melting point of from 118° to 127° C. and a weight average molecular weight of from 80,000 to 100,000.

2. A fibre optic cable as claimed in claim 1 in which the polyethylene composition contains an antioxidant.

3. A fibre optic cable as claimed in claim 2 in which the antioxidant is 1,3,5-timethyl-2,4,6-tris[3,5-tert-butyl-4-hydroxybenzyl]benzene.

4. A fibre optic cable as claimed in claim 2 in which the amount of antioxidant is sufficient to provide a Differential Scanning Calorimeter (DSC) oxidative induction time at 200° C. of more than 40 mins.

5. A fibre optic cable as claimed in claim 2 in which the polyethylene composition containing the antioxidant has a stress crack resistance of at least $F_o$ at 48 hours.

6. A fibre optic cable as claimed in claims 2 in which the polyethylene composition containing antioxidant used to insulate the cable has a brittleness temperature of less than $-50°$ C.

7. A fibre optic cable, suitable for use as submarine telecommunications cable, comprising a tubular electrical conductor within which are tension members and a core containing optical fibres, the tubular electrical conductor being coated with a polyethylene composition characterised in that the polyethylene composition comprises a linear medium density polyethylene which is a copolymer of ethylene and a $C_4$ to $C_{10}$ alpha-olefin which copolymer has a density of from 0.928 to 0.940 g/cm$^3$, a Melt Index of at least 2.5 dg/min, a melting point of from 118° to 127° C. and a weight average molecular weight of from 80,000 to 100,000.

8. A fibre optic cable as claimed in claim 1 or claim 7 in which the polyethylene composition comprises (A) a linear ethylene-butene copolymer having a density of 0.930 g/cm$^3$, a melt index of 3.75 dg/min, a melting point of about 126° C. and a weight average molecular weight of 90,000 and (B) 1,3,5-trimethyl-2,4,6-tris[3,5-tert.-butyl-4-hydroxybenzl]benzene.

9. A process for manufacturing a fibre optic cable comprising extruding about a core containing optical fibres a polyolefin composition characterised in that the polyethylene composition comprises a linear medium density polyethylene which is a copolymer of ethylene and a $C_4$ to $C_{10}$ alpha-olefin which copolymer has a density of from 0.928 to 0.940 g/cm$^3$, a Melt Index of at least 2.5 dg/min, a melting point of from 118° to 127° C. and a weight average molecular weight of from 80,000 to 100,000.

10. A process as claimed in claim 9 in which the core containing optical fibres is within a tubular electrical conductor and the polyolefin composition is extruded over the conductor.

* * * * *